United States Patent
Park (10) Patent No.: US 7,471,329 B2
(45) Date of Patent: Dec. 30, 2008

(54) DIGITAL CAMERA THAT PERFORMS AUTOFOCUSING ACCORDING TO CHROMATIC AND ACHROMATIC SENSING ELEMENTS

(75) Inventor: Myoung-hoon Park, Seongnam-si (KR)

(73) Assignee: Samsung Techwin Co., Ltd., Changwon (KR)

(*) Notice: Subject to any disclaimer, the term of this patent is extended or adjusted under 35 U.S.C. 154(b) by 830 days.

(21) Appl. No.: 10/694,587

(22) Filed: Oct. 27, 2003

(65) Prior Publication Data

US 2004/0090550 A1 May 13, 2004

(30) Foreign Application Priority Data

Oct. 26, 2002 (KR) .................. 10-2002-0065656

(51) Int. Cl.
 H04N 5/232 (2006.01)
 G03B 13/00 (2006.01)
(52) U.S. Cl. .................. 348/350; 348/276; 348/345
(58) Field of Classification Search ............ 348/350, 348/245, 345, 276
 See application file for complete search history.

(56) References Cited

U.S. PATENT DOCUMENTS

| | | | |
|---|---|---|---|
| 6,788,338 B1 * | 9/2004 | Dinev et al. ............ 348/222.1 |
| 6,825,883 B1 * | 11/2004 | Hata ............ 348/345 |
| 6,891,568 B1 * | 5/2005 | Glenn ............ 348/262 |
| 7,154,547 B2 * | 12/2006 | Oda ............ 348/277 |
| 2003/0081265 A1 * | 5/2003 | Watanabe ............ 358/474 |

* cited by examiner

Primary Examiner—Lin Ye
Assistant Examiner—Gevell Selby
(74) Attorney, Agent, or Firm—Drinker Biddle & Reath LLP

(57) ABSTRACT

An image sensing unit with an improved structure and a digital camera adopting the same are provided. The image sensing unit for a digital camera includes a light-receiving surface having a plurality of pixel sensors arranged regularly on a two-dimensional region of a predetermined size, a scanning electronic circuit that outputs light incident onto the pixel sensors as an electric image signal that has undergone photoelectric conversion, and a color filter mosaic separated at a predetermined distance from the light-receiving surface in the light incidence direction. Here, the light-receiving surface is divided into a chromatic sensing element for receiving chromatic light entering through the color filter mosaic and the achromatic sensing element for receiving directly incident achromatic light that has not passed through the color filter mosaic. The digital camera adopting the image sensing unit can achieve smooth automatic focusing in a low brightness environment.

11 Claims, 11 Drawing Sheets

| N | N | N | N | ... | N | N | N |
|---|---|---|---|-----|---|---|---|
| N | N | N | N | ... | N | N | N |
| R | G | R | G | ... | G | R | G |
| G | B | G | B | ... | B | G | B |
| ... | ... | ... | ... | ... | ... | ... | ... |
| R | G | R | G | ... | G | R | G |
| G | B | G | B | ... | B | G | B |

20c = top 2 rows; 20b = remaining rows

FIG. 6B

| R | G | R | G | ... | G | R | G |
|---|---|---|---|-----|---|---|---|
| G | B | G | B | ... | B | G | B |
| R | G | R | G | ... | G | R | G |
| G | B | G | B | ... | B | G | B |
| ... | ... | ... | ... | ... | ... | ... | ... |
| N | N | N | N | ... | N | N | N |
| N | N | N | N | ... | N | N | N |

20b = top rows; 20c = bottom 2 rows

FIG. 6C

| N | N | R | G | ... | G | R | G |
|---|---|---|---|---|---|---|---|
| N | N | G | B | ... | B | G | B |
| N | N | R | G | ... | G | R | G |
| N | N | G | B | ... | B | G | B |
| ... | ... | ... | ... | ... | ... | ... | ... |
| N | N | R | G | ... | G | R | G |
| N | N | G | B | ... | B | G | B |

| Ye | Cy | Ye | Cy | ... | Cy | Ye | Cy |
|---|---|---|---|---|---|---|---|
| G | Mg | G | Mg | ... | Mg | G | Mg |
| Ye | Cy | Ye | Cy | ... | Cy | Ye | Cy |
| G | Mg | G | Mg | ... | Mg | G | Mg |
| ... | ... | ... | ... | ... | ... | ... | ... |
| Ye | Cy | N | N | ... | N | Ye | Cy |
| G | Mg | N | N | ... | N | G | Mg |

| N | N | N | N | ... | N | N | N | } 20c |
|---|---|---|---|---|---|---|---|---|
| R | G | R | G | ... | G | R | G | |
| G | B | G | B | ... | B | G | B | |
| ... | ... | ... | ... | ... | ... | ... | ... | } 20b |
| R | G | R | G | ... | G | R | G | |
| G | B | G | B | ... | B | G | B | |

FIG. 7B

| G | B | G | B | ... | B | G | B | } 20c |
|---|---|---|---|---|---|---|---|---|
| R | G | R | G | ... | G | R | G | |
| G | B | G | B | ... | B | G | B | |
| ... | ... | ... | ... | ... | ... | ... | ... | } 20b |
| R | G | R | G | ... | G | R | G | |
| G | B | G | B | ... | B | G | B | |

DIGITAL CAMERA THAT PERFORMS AUTOFOCUSING ACCORDING TO CHROMATIC AND ACHROMATIC SENSING ELEMENTS

This application claims priority to Korean Patent Application No. 2002-65656, filed on Oct. 26, 2002, in the Korean Intellectual Property Office, the disclosure of which is incorporated herein in its entirety by reference.

FIELD OF THE INVENTION

The present invention relates to a digital camera, and more particularly, to a digital camera adopting an image sensing unit with an improved structure for automatic focusing.

BACKGROUND OF THE INVENTION

FIGS. 1, 2A, 2B, and 3 depict the color filtration of a conventional digital camera.

Figure 1:
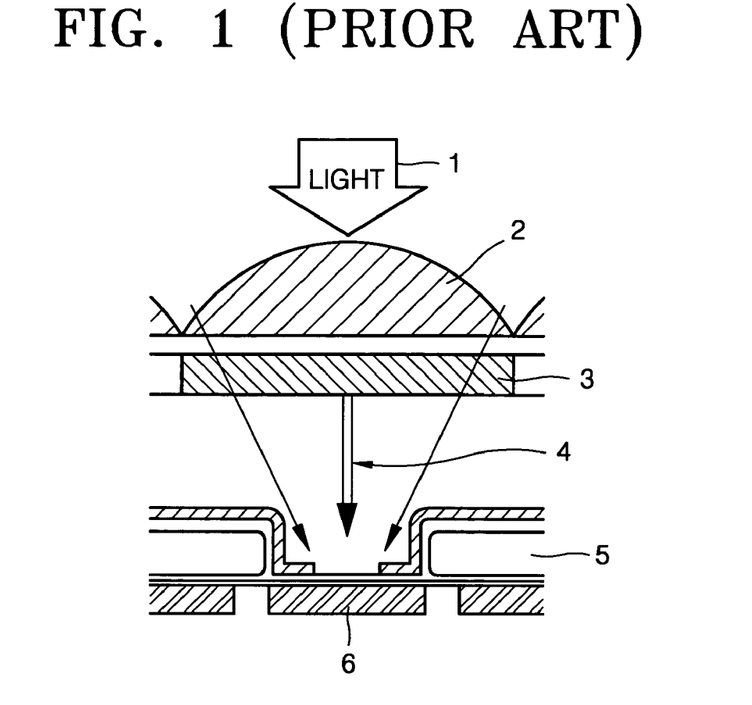
FIG. 1 shows the internal structure of a chromatic sensing unit adopting a color filter in a digital camera and changes in the amount of incident light before and after passing through the color filter.

FIG. 1 shows the internal structure of a chromatic sensing unit adopting a color filter (3) in a digital camera, and changes in the incident light after passing through the color filter (3). Referring to FIG. 1, light (1) incident from the outside is converged by a microlens (2), and the light (4) passing through the color filter (3) corresponding to each pixel enters the photodiode (6). The reference numeral 5 denotes a silicon oxide layer. The chromatic sensing unit used in a digital camera is configured so that a color filter mosaic, which is a grid of the primary color filters (red-green-blue, "RGB") or complementary color filters (yellow/cyan/green/magenta, "Ye/Cy/G/Mg"), is applied on a photodiode (6) located in each pixel. This allows only light (4) of a color corresponding to the color filter (3) for each pixel to be transmitted so that the corresponding photodiode (6) reacts with the light (4).

Figure 2A:
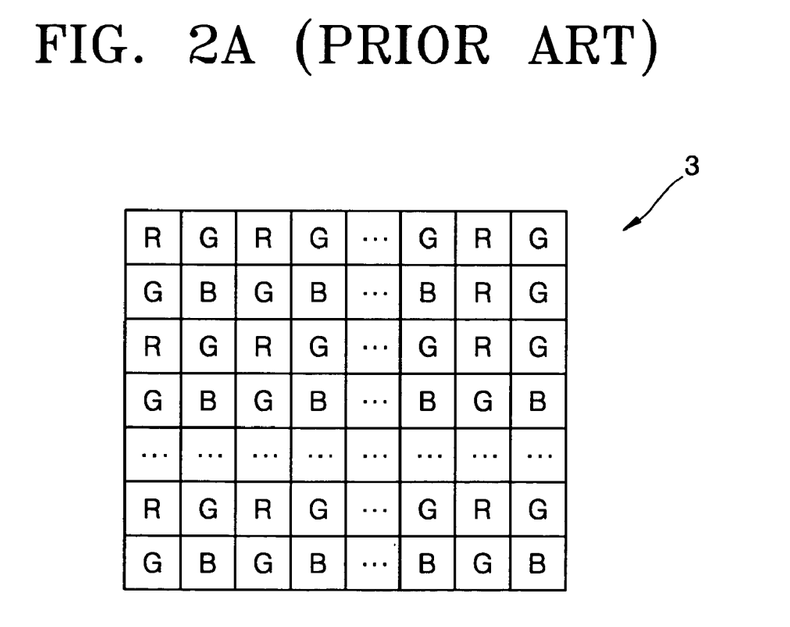
FIG. 2A shows a color filter mosaic array of pixel sensors adopting RGB primary color filters in a conventional digital camera.
Figure 2B:
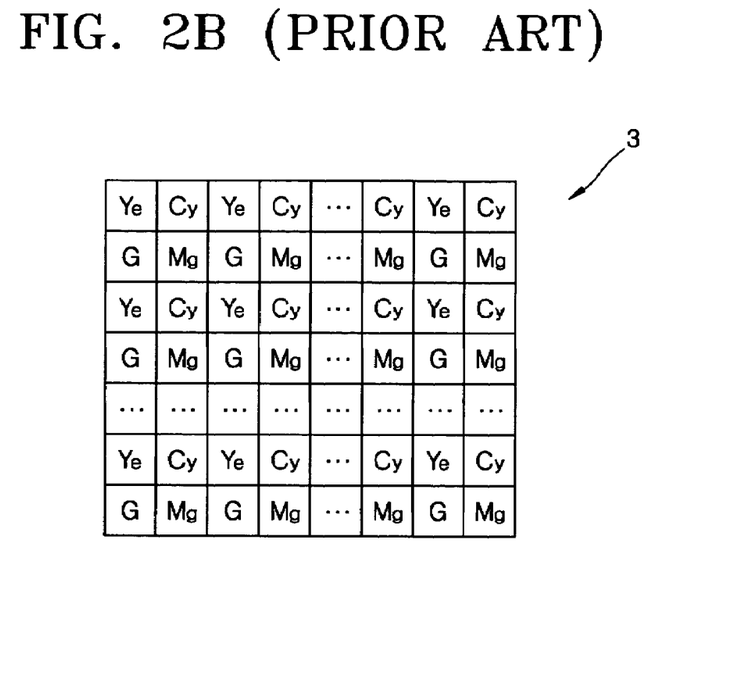
FIG. 2B shows a color filter mosaic array of pixel sensors adopting Ye/Cy/G/Mg complementary color filters in a conventional digital camera.

FIGS. 2A and 2B show color filter mosaic arrays of pixel sensors adopting the RGB primary and Ye/Cy/G/Mg complementary color filters in a conventional digital camera, respectively. The color filter mosaic arrays of FIGS. 2A and 2B correspond to the color filter (3) of FIG. 1.

Automatic focusing (AF) of a digital camera is a technique of focusing on an object by analyzing the high frequency content of an image of the object input from an image sensing unit while moving a focusing lens. This focusing technique is allowed only when an automatic brightness level is greater than the minimum brightness. The brightness level of the light (4) that passes through the color filter (3) physically decreases compared with incident light (1) prior to passing through the color filter (3). Thus, since the brightness level recognized by the sensor becomes lower after light passes through the color filter (3), the amplitude of the signal output from the sensor decreases. Due to the changes in brightness levels as light passes through the filter (3), the brightness level of the incident light (1) onto the sensor decreases to less than a brightness threshold in a low brightness environment. This may cause the output of the optical sensor to decrease to the extent automatic focusing cannot be performed.

SUMMARY OF THE INVENTION

The present invention provides an image sensing unit for a digital camera, which has an improved structure to satisfactorily perform automatic focusing even in a low brightness environment.

The present invention also provides a digital camera adopting the improved image sensing unit to satisfactorily perform automatic focusing in a low brightness environment.

According to an aspect of the present invention, there is provided an image sensing unit for a digital camera including a light-receiving surface having a plurality of pixel sensors arranged regularly on a two-dimensional region of a predetermined size, a scanning electronic circuit that outputs light incident onto the pixel sensors as an electric image signal that has undergone photoelectric conversion, and a color filter mosaic separated at a predetermined distance from the light-receiving surface in the light incidence direction. In this embodiment, the light-receiving surface is divided into a chromatic sensing element for receiving chromatic light entering through the color filter mosaic and an achromatic sensing element for receiving directly incident achromatic light that has not passed through the color filter mosaic.

The achromatic sensing element is comprised of pixel sensors the area of which is larger than that of pixel sensors in the chromatic sensing element.

According to another aspect of the present invention, there is provided a digital camera having an imaging device for photographing an image of a subject, a digital signal processor for performing image processing on the image data received from the imaging device, and a data storage device. The digital camera includes: an automatic focusing shutter operated by a user for outputting an automatic focusing indication signal; an image sensing unit having a light-receiving surface containing a plurality of pixel sensors arranged regularly on a two-dimensional region of a predetermined size, a scanning electronic circuit that outputs incident light onto the plurality of pixel sensors as a digital image signal that has undergone photoelectric conversion, and a color filter mosaic separated at a predetermined distance from the light-receiving surface in the incident light direction, wherein the light-receiving surface is divided into a chromatic sensing element for receiving chromatic light entering through the color filter mosaic and the achromatic sensing element for receiving direct incident achromatic light that has not passed through the color filter mosaic; and an automatic focusing unit that receives the digital image signal from the image sensing unit and performs automatic focusing in response to the automatic focusing indication signal.

In one embodiment of the present invention, the automatic focusing unit includes: a brightness comparator that compares the digital image signal received from the image sensing unit with a predetermined reference brightness signal and outputs the comparison result in response to the automatic focusing indication signal; a region selector that receives the digital image signal and outputs a chromatic digital image signal in response to the automatic focusing indication signal and selects one of the chromatic and achromatic image signals in response to the brightness comparison result; a focus signal generator that analyzes the high frequency component of the digital image signal received from the region selector, calculates a focal value, and outputs a focus signal at the time the focal value is a maximum in response to the automatic focus indication signal; and a focusing lens driving unit that moves a focusing lens within a predetermined range in response to the automatic focusing indication signal and fixes the location of the focusing lens in response to the focus signal.

BRIEF DESCRIPTION OF THE DRAWINGS

The above objects and advantages of the present invention will become more apparent by describing in detail preferred embodiments thereof with reference to the attached drawings.

DETAILED DESCRIPTION OF THE INVENTION

An image sensing unit for a digital camera having an improved structure and the configuration and operation of a digital camera adopting the image sensing unit according to this invention will now be described more fully with reference to the accompanying drawings. The same reference numerals in different drawings represent the element performing the same function.

The brightness level of light that has passed through a color filter is less than the brightness level of the light before it passed through the color filter. Thus, since the brightness level of the light recognized by a sensor is less than before the light passed through the color filter, the amplitude of a signal produced from the pixel sensor through photoelectric conversion decreases after the light passes through the color filter. Automatic focusing (AF) performed in a digital camera, known as through-the-lens (TTL), is a mechanism of focusing on an object by analyzing the high frequency content of an incoming object image while moving a focusing lens.

If a focusing lens is positioned at the focal location, the contour of an object image becomes the clearest. That is, the high frequency component of the object image is the largest. Since a brightness level decreases to a greater extent in a low brightness environment, an output signal of a pixel sensor decreases in amplitude to the extent that the contour of the incoming object image cannot be analyzed accurately during automatic focusing. The basic concept of this invention is that an image is photographed after performing automatic focusing using a pixel region adopting a color filter under a normal brightness environment or using a pixel region not adopting the color filter under a low brightness environment.

Figure 3:
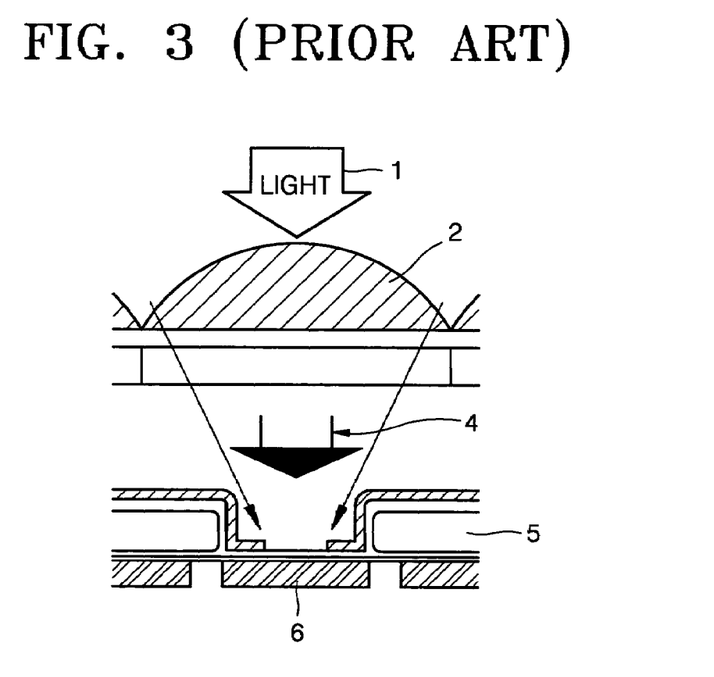
FIG. 3 shows incident light coming into contact with a pixel sensor not adopting a color filter.

FIG. 3 shows incident light coming into contact with a pixel sensor not adopting a color filter. Incident light 1 contacting the pixel sensor is converged by a microlens 2. However, unlike the pixel sensor adopting the color filter 3 shown in FIGS. 1, 2A, and 2B, there is no change between the incident light converging onto the microlens 2 and light 4 that has passed through the microlens 2. The pixel sensor not adopting a color filter as shown in FIG. 3 forms the basis of an achromatic sensing element 20c shown in FIGS. 4A and 4B that will be described later.

Figure 4A:
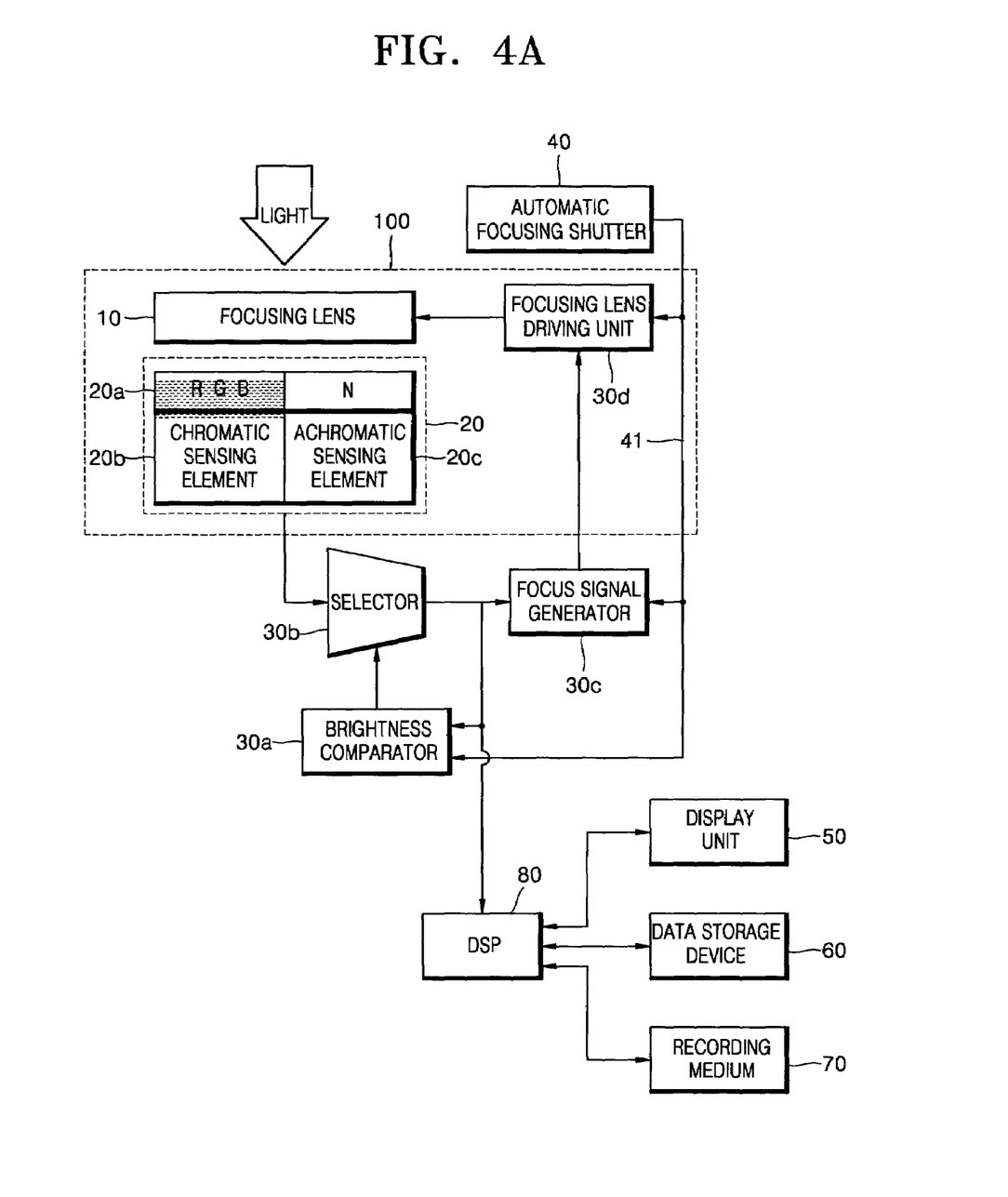
FIG. 4A is a block diagram showing the configuration of a digital camera adopting an improved image sensing unit according to a preferred embodiment of the present invention.
Figure 4B:
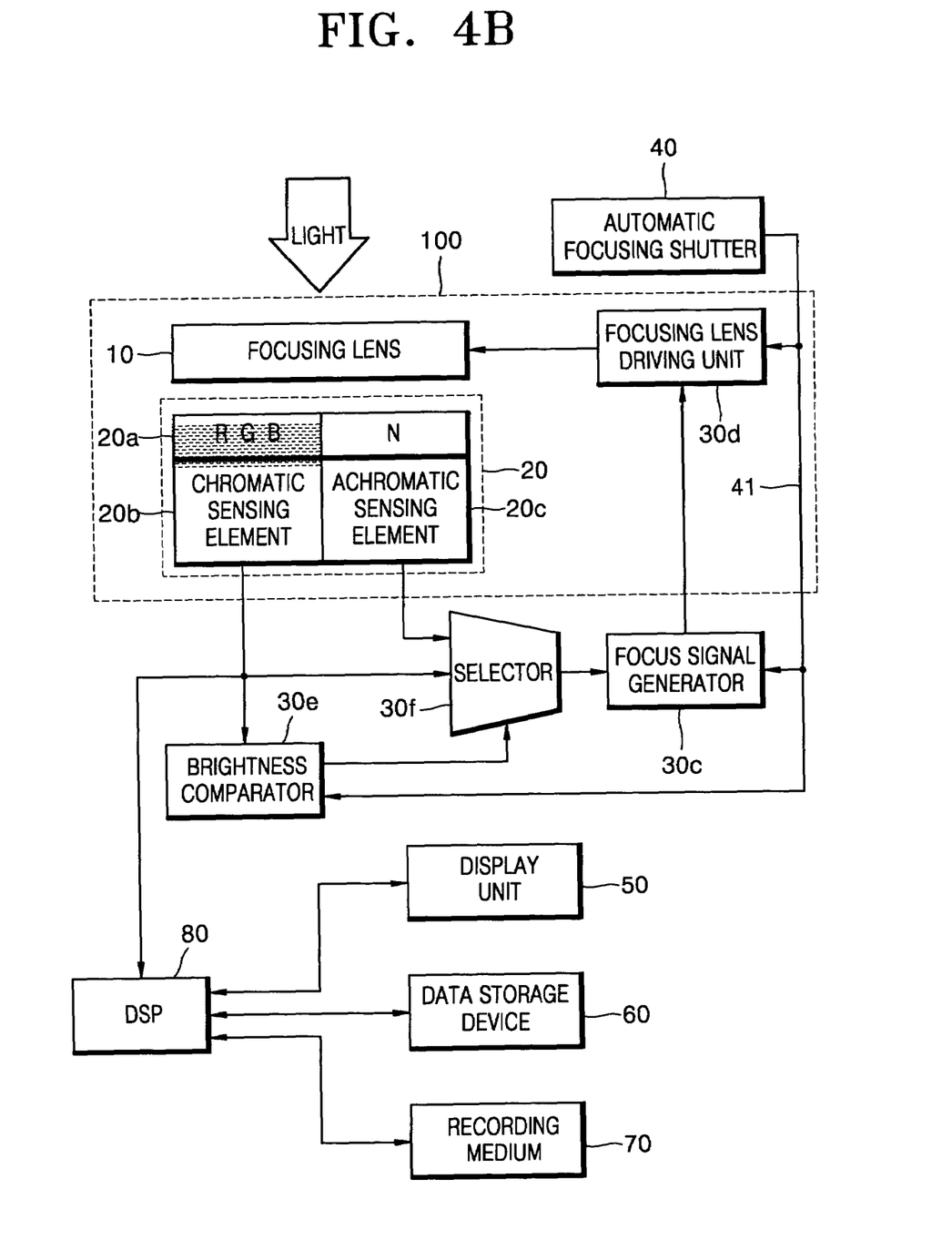
FIG. 4B is a block diagram showing the configuration of a digital camera adopting an improved image sensing unit according to another preferred embodiment of the present invention.

FIG. 4A is a block diagram showing the configuration of a digital camera adopting an improved image sensing unit 20 according to a preferred embodiment of this invention. FIG. 4B is a block diagram showing the configuration of a digital camera adopting the improved image sensing unit 20 according to another preferred embodiment of this invention.

Referring to FIG. 4A, the digital camera according to the present invention is comprised of an automatic focusing shutter 40, an image photographing unit 100, automatic focusing units 30a-30d, a digital signal processor 80, a display unit 50, a data storage unit 60, and a recording medium 70.

The image photographing unit 100 for photographing an image of an object comprises a focusing lens 10, a focusing lens driving unit 30d including driving mechanism and circuit for driving the focusing lens 10, an image sensing unit 20 realized by a metal oxide semiconductor (MOS) image sensor or a charged coupled device (CCD). Although not shown in the drawings, the image photographing unit 100 may include a timing circuit that drives the image sensing unit 20, a correlated double sampling circuit, an amplifying circuit, and an analog-to-digital converter. The image sensing unit 20 in this invention consists of a color filter mosaic 20a, a chromatic sensing element 20b, and an achromatic sensing element 20c.

The digital signal processor (DSP) 80 performs image processing on image data received from the image sensing unit 20. The DSP 80 may be realized by including a brightness comparator 30a or 30e, a selector 30b or 30f, and a focus signal generator 30c as shown in FIGS. 4A and 4B.

The data storage unit 60 includes a temporary storage unit and a non-volatile storage unit. The temporary data storage unit temporarily stores digital image data received from the DSP 80. The non-volatile storage unit may store setup and control algorithms for a digital camera.

Examples of the recording medium 70 include storage units such as portable compact flash card, smart media, and memory stick inserted into a recording medium interface of the digital camera for storing digital image data.

The automatic focusing shutter 40 is operated by the user and outputs an automatic focusing indication signal 41. The operation of a shutter of a camera having an automatic focusing function is typically comprised of two steps. The first step is to perform appropriate exposure control, color adjustment, and automatic focusing functions in order to set values that allow the user to take the best quality photo. The second step is to perform a series of processes, i.e., record the taken photo onto a storage medium. The automatic focusing shutter 40 performs the first step.

The image sensing unit 20 according to this invention will now be described more fully with references to FIGS. 4A, 4B, 5A, and 5B.

The image sensing unit 20 for a digital camera according to this invention includes light-receiving surfaces 20b and 20c, each having a plurality of pixel sensors arranged regularly on a two-dimensional region of a predetermined size, a scanning electronic circuit (not shown) that outputs incident light onto the pixel sensors as an electric image signal that has undergone photoelectric conversion, and the RGB color filter mosaic 20a separated at a predetermined distance from the light-receiving surfaces 20b and 20c in the direction of the incident light. The light-receiving surfaces 20b and 20c of the image sensing unit 20 according to this invention are divided into the chromatic sensing element 20b for receiving chromatic light entering through the RGB color filter mosaic 20a and the achromatic sensing element 20c for receiving achromatic light directly entering the element 20c instead of passing through the color filter mosaic 20a. Portions indicated by "N" in the drawings mean those not having a color filter. The achromatic sensing element 20c is comprised of pixel sensors configured as shown in FIG. 3.

Although not shown in the drawings, the image sensing unit 20 may also include photoelectric conversion and analog-to-digital conversion circuits. The image sensing unit 20 allows an object image that is input as light to be photographed and outputted as a digital image signal. The light-receiving surface of the image sensing unit 20 may be realized by a MOS image sensor or a CCD.

Figure 5A:
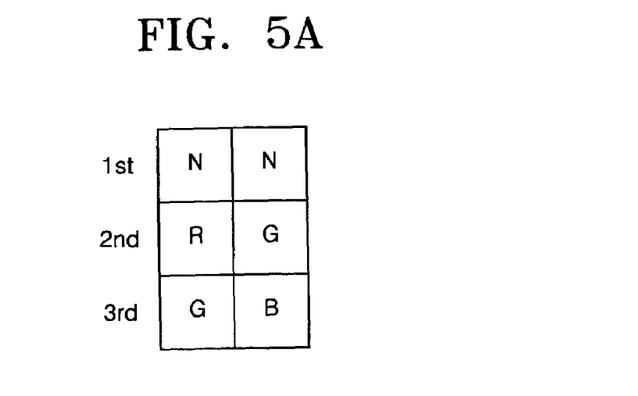
FIG. 5A shows the image sensing unit having the achromatic and chromatic sensing elements shown in FIG. 4A or 4B according to an embodiment of this invention.
Figure 5B:
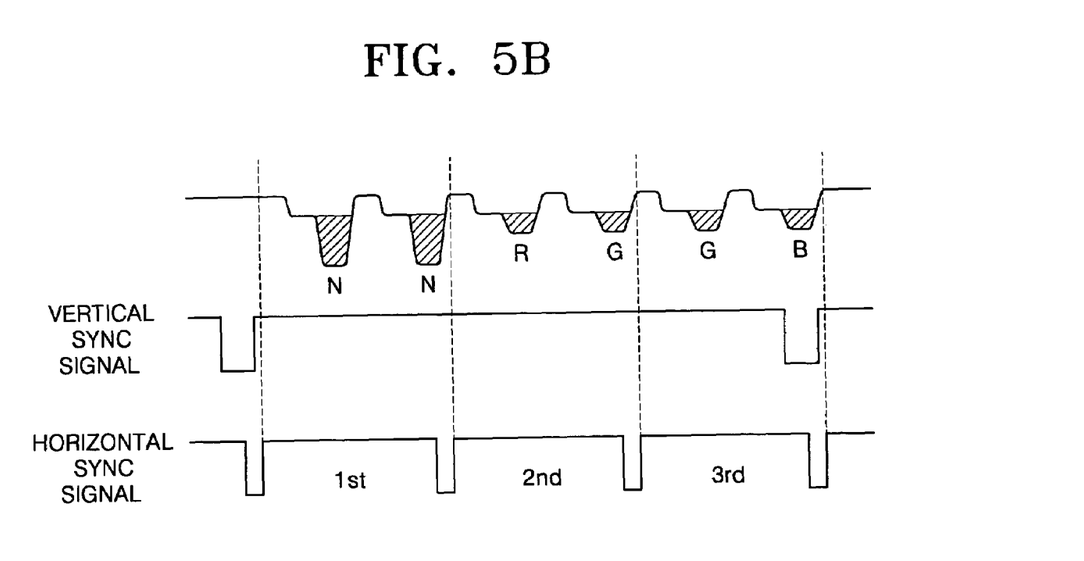
FIG. 5B depicts the comparison between amplitudes of electric signals produced by photoelectric conversion in the achromatic and chromatic sensing elements when uniform light is incident onto the light-receiving surface of the image sensing unit of FIG. 5A.

FIG. 5A shows the image sensing unit 20 having the achromatic (N) and chromatic (RGB) sensing elements 20c and 20b shown in FIG. 4A or 4B according to an embodiment of this invention. FIG. 5B depicts the difference between magnitudes of electric signals produced through photoelectric conversion in the achromatic (N) and chromatic (RGB) sensing elements 20c and 20b when uniform light is in contact with the light-receiving surface of the image sensing unit 20 of FIG. 5A;

To represent colors in a digital camera, a specific color filter is provided for each pixel. This allows the camera to transmit only a color corresponding to the specific color filter and to convert the color component into an electric signal in an image sensing unit. In this invention, the color filter mosaic 20a is spaced apart a predetermined distance from the pixel sensors of the chromatic sensing element 20b in the direction of the incident light in such a way as to correspond one-to-one to each pixel sensor. The achromatic sensing element 20c consists of a plurality of pixel sensors, each of which does not correspond to the color filter mosaic 20a.

Thus, when uniform light is in contact with the light-receiving surface of the image sensing unit 20 as shown in FIG. 5A, the image sensing unit 20 produces a potential well into the achromatic (N) sensing element 20c deeper than into the chromatic (RGB) sensing element 20b and outputs an electric signal using horizontal and vertical sync signals.

The chromatic and achromatic sensing elements 20b and 20c in the image sensing unit 20 may be configured so that they are each controlled by separate control signals and output photoelectrically converted signals through separate paths. The image sensing unit 20 uses a vertical sync signal as a sync signal for outputting all pixel values while using a horizontal sync signal for outputting pixel values along a particular line. By separately inputting the horizontal and vertical sync signals to the chromatic and achromatic sensing elements 20b and 20c and providing separate output lines for both of them, the chromatic and achromatic sensing elements 20b and 20c can be separately controlled and output image signals. This will be described more fully below in automatic focusing units 30c-30f according to a second embodiment of this invention.

Figure 6A:
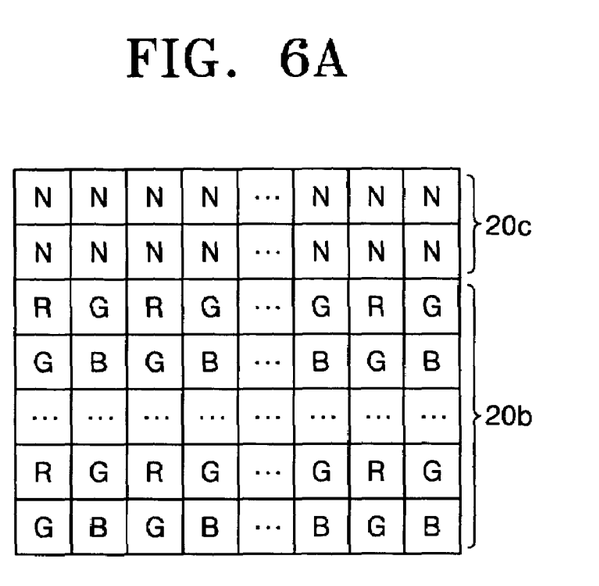
FIG. 6A shows the achromatic sensing element located on the upper portion of the image sensing unit according to an embodiment of this invention.
Figure 6B:
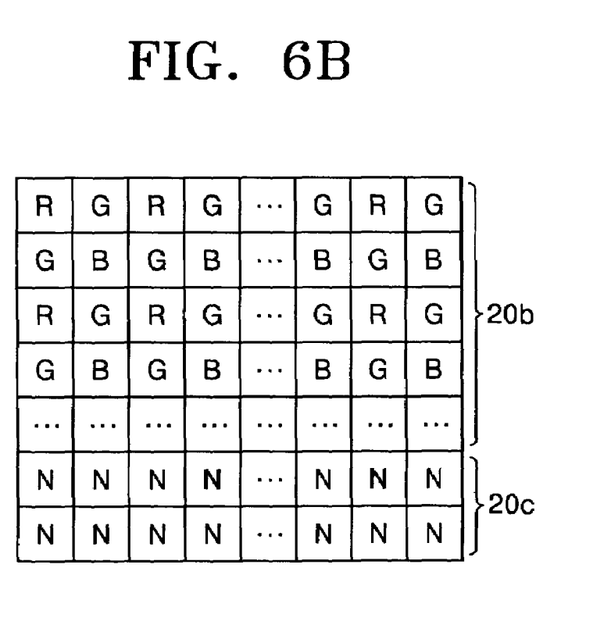
FIG. 6B shows the achromatic sensing element located on the lower portion of the image sensing unit according to another embodiment of this invention.
Figure 6C:
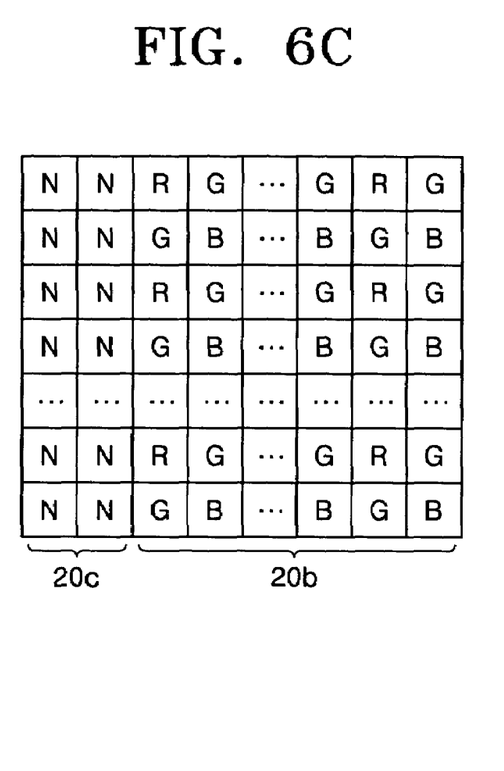
FIG. 6C shows the achromatic sensing element located on the left side of the image sensing unit according to another embodiment of this invention.
Figure 6D:
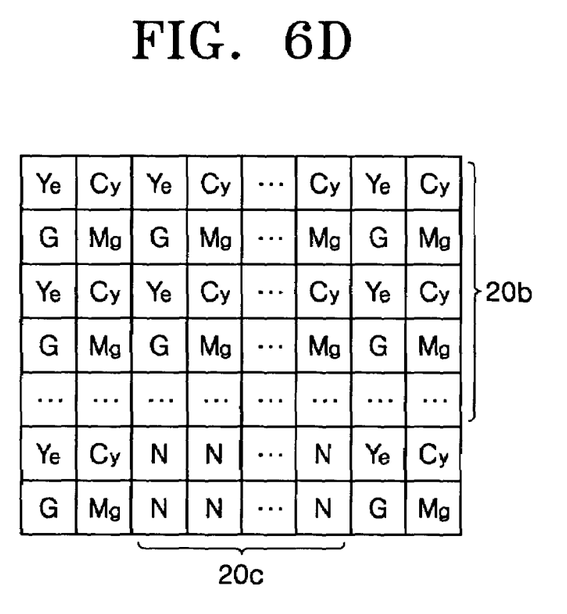
FIG. 6D shows the achromatic sensing element located on the lower, central portion of the image sensing unit according to another embodiment of this invention.

FIGS. 6A-6D show embodiments in which the achromatic sensing element 20c is located on the upper and lower portions and on the left side of the image sensing unit 20. The regions of pixel sensors, which are indicated by N in the drawings, represent the achromatic sensing element 20c. As shown in FIG. 6D, the RGB primary color filter mosaics shown in FIGS. 6A-6C may be replaced with a Ye/Cy/G/Mg complementary color filter mosaic.

Figure 7A:
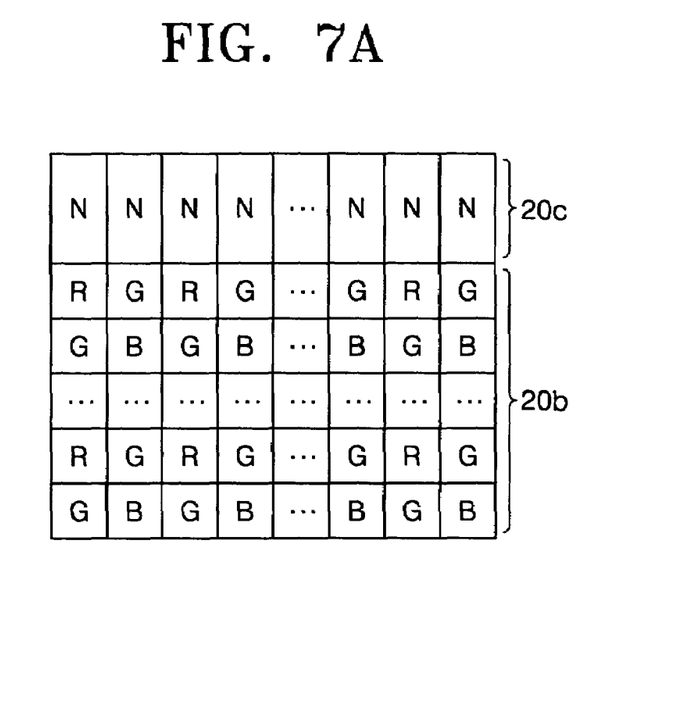
FIG. 7A shows an image sensing unit in which the area of pixel sensors within the achromatic sensing element is greater than that of pixel sensors within the chromatic sensing element according to an embodiment of this invention.
Figure 7B:
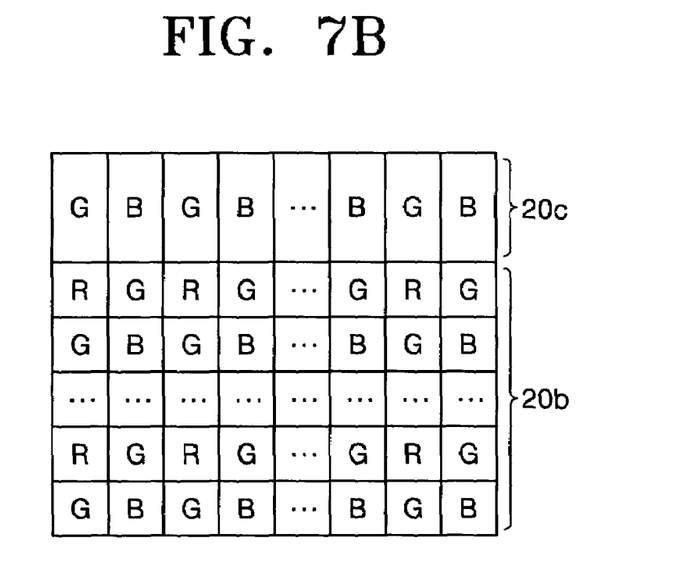
FIG. 7B shows an image sensing unit in which a color filter corresponds to the achromatic sensing element according to another embodiment of this invention.

The achromatic sensing element 20c, as shown in FIGS. 7A and 7B, may be comprised of pixel sensors the area of which is larger than that of pixel sensors in the chromatic sensing element 20b. FIG. 7A shows the image sensing unit 20 in which the area of pixel sensors within the achromatic sensing element 20c are greater than the pixel sensors within the chromatic sensing element 20b according to an embodiment of this invention. In FIG. 7A, the regions of the pixel sensors indicated by N represent the achromatic sensing element 20c. For example, if light having the same brightness level per area enters each pixel sensor, a pixel sensor with twice the light receiving area is able to output a photoelectrically converted signal with twice the amplitude. As shown in FIGS. 6A-6D, the achromatic sensing element 20c may be located on the upper and lower portions and the right and left sides of the image sensing unit 20 with respect to the chromatic sensing element 20b adopting an RGB primary or Ye/Cy/G/Mg complementary filter.

FIG. 7B shows the image sensing unit 20 in which a color filter corresponds to the achromatic sensing element 20c according to another embodiment of this invention. While the regions of the achromatic sensing element 20c shown in FIG. 7B have photosensitivity lower than the regions N shown in FIG. 7A, they have photosensitivity higher than a typical chromatic pixel sensor due to a large light receiving area.

As an embodiment of a digital camera according to this invention, the image photographing unit 100 includes the focusing lens 10, the image sensing unit 20, and the focusing lens driving unit 30d.

In an actual configuration of the image photographing unit 100 for a digital camera, the imaging sensing unit 20 shown in FIG. 4B may include photoelectric conversion and analog-to-digital conversion circuits. The example of these circuits may include a correlated double sampling (CDS) circuit and an analog-to-digital converter. Eventually, the image sensing unit 20 allows an object image that is input as light to be photographed and output as a digital image signal.

Turning to FIGS. 4A and 4B, the automatic focusing units 30a, 30b, 30c, and 30d according to a first embodiment of this invention shown in FIG. 4A and the counterparts 30e, 30f, 30c, and 30d according to a second embodiment shown in FIG. 4B will now be described in more detail.

In the digital camera according to this invention, the automatic focusing units 30a-30d performs automatic focusing in response to the automatic focusing indication signal 41.

Referring to FIG. 4A, the automatic focusing units 30a-30d according to the a preferred embodiment of this invention includes the brightness comparator 30a, the selector 30b, the focus signal generator 30c, and the focusing lens driving unit 30d.

The brightness comparator 30a compares a signal received from the selector 30b with a predetermined reference brightness signal and outputs the comparison result in response to the automatic focusing indication signal 41 received from the automatic focusing shutter 40. The predetermined reference brightness means the lowest brightness level below which automatic focusing cannot be normally performed. The brightness comparator 30a allows the selector 30b to output an image signal corresponding to the chromatic sensing element 20b at a normal brightness level greater than the reference brightness. In contrast, the brightness comparator 30a allows the selector 30b to output an image signal corresponding to the achromatic sensing element 20c at a low brightness level less than the reference brightness.

The selector 30b selectively outputs a chromatic or achromatic image signal in response to the brightness comparison result received from the brightness comparator 30a. That is, the selector 30b outputs a chromatic signal during an initial period of automatic focusing while outputting an achromatic signal in response to the brightness comparison result indicative of a low brightness environment.

Figure 8:
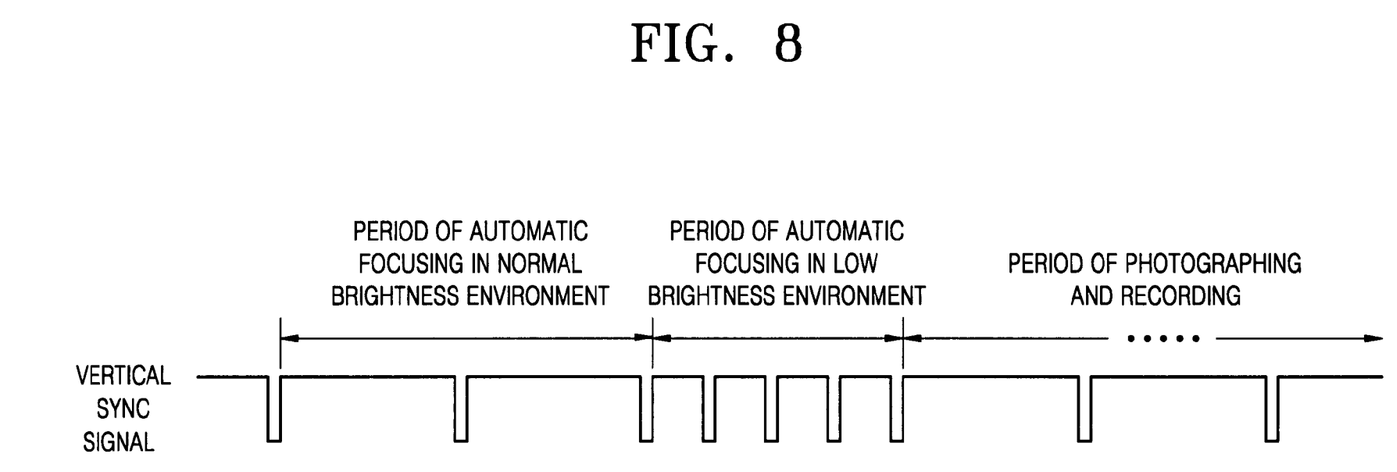
FIG. 8 is a timing chart for explaining the period of a vertical sync signal for automatic focusing in a digital camera according to this invention.

In this case, the selector 30b may be implemented to generate a vertical sync signal that controls an output of the image sensing unit 20. Although not shown in the drawing, the vertical sync signal generated in the selector 30b is output to the image sensing unit 20. The vertical sync signal indicates the output of an electric signal stored in a pixel of the image sensing unit 20. A pixel value is output from the image sensing unit 20 during the vertical sync signal is input to the image sensing unit 20 at a high level. The high level interval of vertical sync signal changes depending on whether a brightness level is normal or lower. That is, in a normal brightness environment, the vertical sync signal is generated so as to output all pixel values of the image sensing unit 20. However, in a low brightness environment, it is generated so as to output only pixel values of the achromatic sensing element 20c. FIG. 8 is a timing chart for explaining the period of a vertical sync signal for automatic focusing in a digital camera according to this invention. As is evident from FIG. 8, automatic focusing can be performed at higher speed under a low brightness environment.

In response to the automatic focus indication signal 41, the focus signal generator 30c analyzes the high frequency component of the received image signal and outputs a focus signal. The focus signal generator 30c determines the location where the high frequency component of the received image signal is maximal as a focal location, and outputs a focus signal at the focal location. (The high frequency maximum corresponds with sharp image contours.) The focusing lens driving unit 30d moves the focusing lens 10 within a predetermined range in response to the automatic focusing indication signal 41 and fixes the location of the focusing lens 10 in response to the focus signal received from the focus signal generator 30c. Although not shown in FIG. 4A, the focusing lens driving unit 30d includes driving device and circuit for driving the focusing lens 10.

Referring to FIG. 4B, a digital camera according to the second preferred embodiment of this invention includes modified examples of automatic focusing units 30e and 30f. That is, the brightness comparator 30e and selector 30f have a different configuration than the first embodiment of FIG. 4. The embodiment of FIG. 4B is configured so that the chromatic and achromatic sensing elements 20b and 20c are separately controlled and output an electric image signal through a separate path. Here, the same reference numeral as in FIG. 4a represents the element performing the same element. The chromatic and achromatic sensing elements 20b and 20c are controlled separately in this way to output only chromatic and achromatic image signals, respectively. In this case, the selector 30f selects either chromatic or achromatic sensing element 20b or 20c according to the brightness comparison result and connects the selected one to the focus signal generator 30c.

The brightness comparator 30e compares a signal received from the selector 30f with a predetermined reference brightness signal and outputs the comparison result in response to the automatic focusing indication signal 41 received from the automatic focusing shutter 40. The predetermined reference brightness means the lowest brightness level below which automatic focusing cannot be considered to be normally performed. The brightness comparator 30e allows the selector 30f to output an image signal corresponding to the chromatic sensing element 20b of the image sensing unit 20 at a normal brightness level greater than the reference brightness. In contrast, the brightness comparator 30e allows the selector 30f to output an image signal corresponding to the achromatic sensing element 20c at a low brightness level less than the reference brightness.

In the embodiment shown in FIG. 4B, the selector 30f selectively outputs one of chromatic and achromatic image signals from the chromatic and achromatic sensing elements 20b and 20c, respectively, in response to brightness comparison result received from the brightness comparator 30e. The focus signal generator 30c receives the image signal from the selector 30f and generates a focus signal. The focusing lens driving unit 30d adjusts the focusing lens 10 to a focal location in response to the focus signal.

Figure 9A:
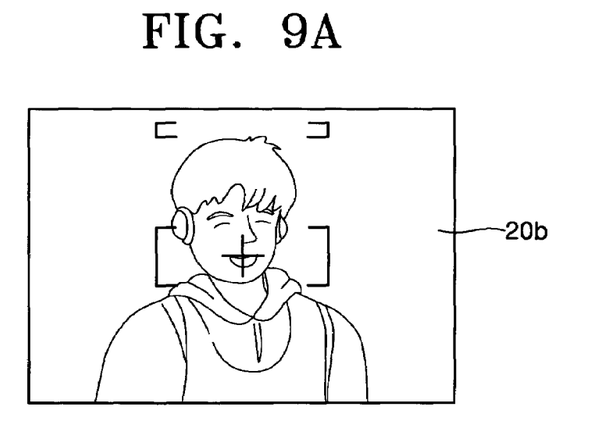
FIGS. 9A-9C shows an automatic focusing process using a digital camera according to this invention.
Figure 9B:
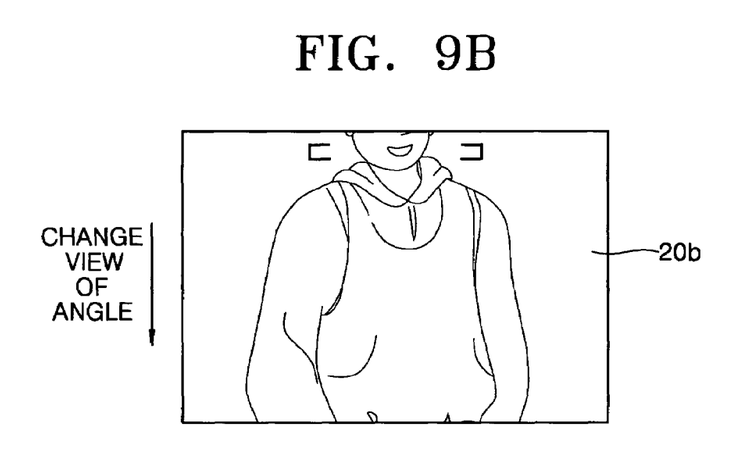
Figure 9C:
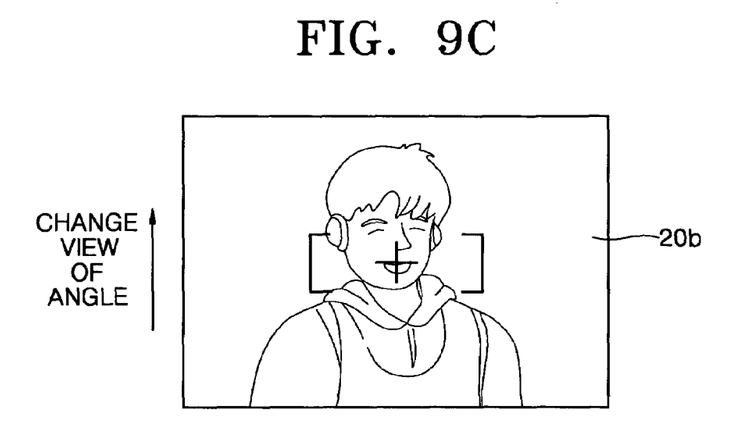

The display unit 50 displays image data output from the DSP 80. The display unit 50 may be realized by a color LCD monitor as an embodiment. FIGS. 9A-9C show an embodiment in which an automatic focusing process using a digital camera according to this invention is displayed on the display unit 50. The display unit 50 indicates a portion of a subject that the camera will focus on by blinking on an on-screen-display (OSD) in order to perform automatic focusing in a low brightness environment. It is assumed that a portion desired to focus on is the subject's face. Referring to FIG. 9A, blinking the OSD such as a red lamp on the upper portion of the display unit 50 indicates a low brightness environment that will make automatic focusing impossible. As shown in FIG. 9B, the user recognizes this and adjusts an angle of view so that the desired subject's portion is moved to the corresponding region of the achromatic sensing element 20c. That is, the subject's face has been moved to the corresponding region of the achromatic sensing element 20c. This does not appear on the screen of the display unit 50.

Referring to FIG. 9C, the user then presses the button of the automatic focusing shutter 40 in order to perform automatic focusing, reset an angle of view as desired, and photographs an image at the desired angle of view.

Figure 10:
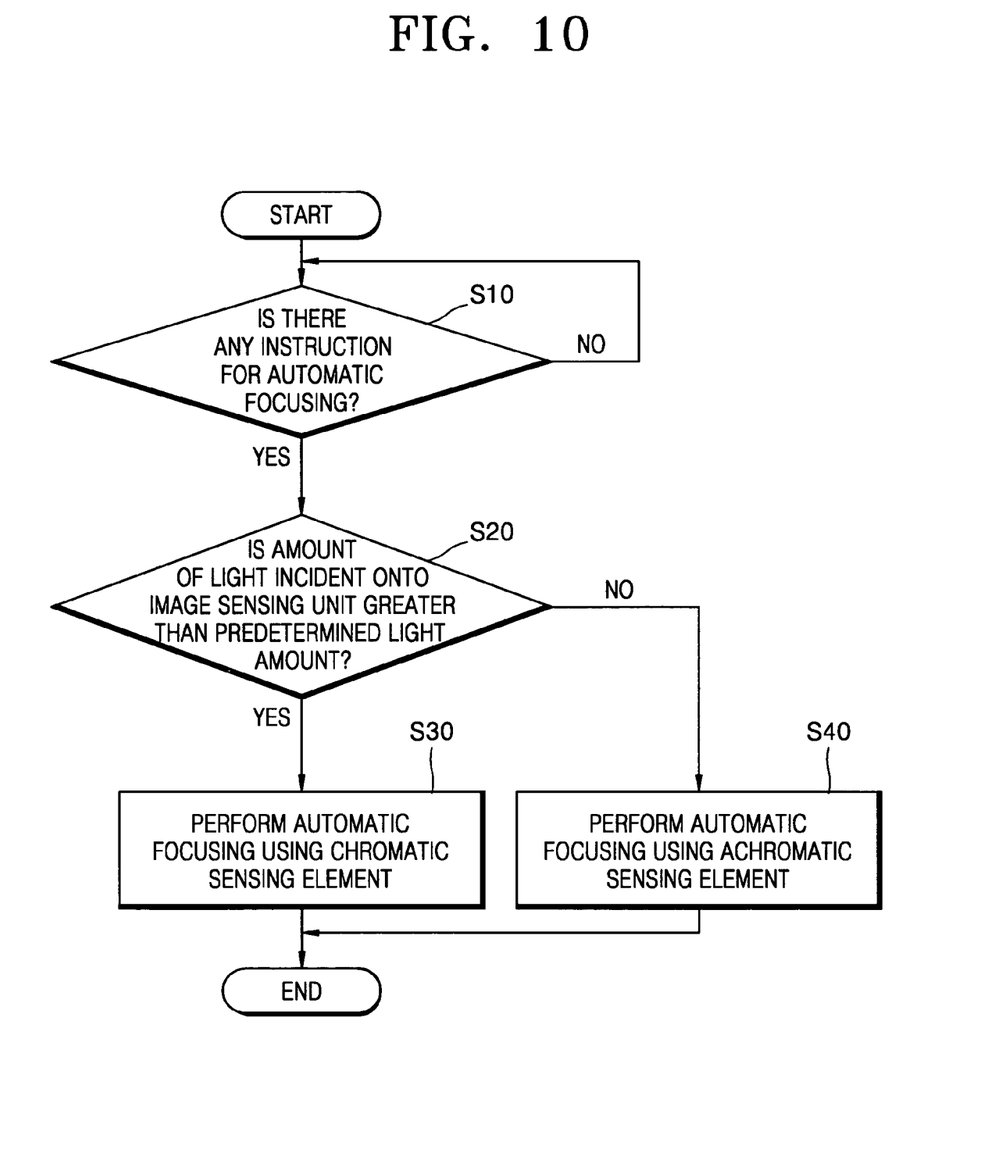
FIG. 10 is a flowchart showing an automatic focusing method according to a preferred embodiment of the present invention.

FIG. 10 is a flowchart showing an automatic focusing method according to a preferred embodiment of the present invention performed by the digital cameras of FIGS. 4A and 4B. Referring to FIG. 10, the automatic focusing method includes the steps of continuously determining whether there is an instruction for automatic focusing (step S10), determining a brightness level (step S20), and performing automatic focusing at a normal brightness environment (step S30) or performing automatic focusing at a low brightness environment (step S40).

Specifically, if there is an instruction for automatic focusing through the automatic focusing shutter 40 from the user in the step S10, it is determined whether the brightness level of light entering the chromatic sensing element 20b through the color filter is greater than a predetermined brightness threshold in step S20. If the brightness level is greater than the brightness threshold, automatic focusing is performed using the chromatic sensing element 20b. If the brightness level is smaller than the brightness threshold, automatic focusing is performed using the achromatic sensing element 20c in the step S40.

As described above, an image sensing unit with an improved structure and a digital camera adopting the image sensing unit according to this invention can achieve satisfactory automatic focusing in a low brightness environment.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A digital camera comprising:
   (a) an imaging photography unit comprising a focusing lens, a focusing lens driving unit, and an image sensing unit with a light-receiving surface divided into a chromatic sensing element and an achromatic sensing element, the image sensing unit outputting a digital image signal;
   (b) a digital signal processor that processes the digital image signal;
   (c) a data storage unit;
   (d) an automatic focusing shutter that outputs an automatic focusing indication signal;
   (e) a brightness comparator in communication with an output of the image sensing unit to receive the digital image signal, the brightness comparator, in response to the automatic focusing indication signal, recognizing a sensed brightness of the digital image signal, comparing the sensed brightness of the digital image signal with a predetermined reference brightness and outputting a brightness comparison result;
   (f) a selector in communication with the brightness comparator and the output of the image sensing unit, the selector outputting, in response to the brightness comparison result, a chromatic image signal relative to the chromatic sensing element if the brightness of the digital image signal is greater than the predetermined reference brightness or an achromatic image signal relative to the achromatic sensing element if the brightness of the digital image signal is equal to or smaller than the predetermined reference brightness; and
   (g) a focus signal generator in communication with an output of the selector, the focus signal generator analyzing high frequency components of the chromatic or achromatic image signal from the selector, calculating a focal value according to said high frequency components of the chromatic or achromatic image signal, and outputting the focus signal to the focusing lens driving unit to move the focusing lens to a focal location.

2. The digital camera of claim 1, further comprising a recording medium interface for inserting a recording medium.

3. The digital camera of claim 2, wherein the recording medium comprises a portable compact flash card, smart media, and memory stick.

4. The digital camera of claim 1, further comprising a display unit.

5. The digital camera of claim 4, wherein the display unit is a color LCD monitor.

6. The digital camera of claim 1, wherein the data storage unit comprises a temporary storage unit and a non-volatile storage unit.

7. The digital camera of claim 1, wherein the image sensing unit comprises:
   (a) a light-receiving surface having a plurality of pixel sensors arranged regularly on a two-dimensional region of a predetermined size;
   (b) a scanning electronic circuit that outputs an electric image signal of incident light contacting a plurality of pixel sensors that has undergone photoelectric conversion; and
   (c) a color filter mosaic separated at a predetermined distance from the light-receiving surface in the direction of the incident light.

8. The digital camera of claim 7 wherein the light-receiving surface comprises a chromatic sensing unit for receiving chromatic light entering through the color filter mosaic and an achromatic sensing unit for receiving direct incident achromatic light that has not passed through the color filter mosaic.

9. The digital camera of claim 1 wherein the focusing lens driving unit moves the focusing lens within a predetermined range in response to the automatic focusing indication signal and fixes the location of the focusing lens in response to the focus signal.

10. The digital camera of claim 1, wherein in the chromatic sensing element and achromatic sensing element are controlled by separate control signals and output only photoelectrically converted chromatic and achromatic image signals through separate paths, respectively.

11. The digital camera of claim 1, wherein the light-receiving surface may be realized by a metal oxide semiconductor image sensor or a charged coupled device.

* * * * *